United States Patent
Soder

(10) Patent No.: US 10,802,506 B2
(45) Date of Patent: Oct. 13, 2020

(54) METHOD FOR OPERATING A PRODUCTION PLANT, AND PRODUCTION PLANT

(71) Applicant: SEW-EURODRIVE GMBH & CO. KG, Bruchsal (DE)

(72) Inventor: Johann Soder, Hambrücken (DE)

(73) Assignee: SEW-EURODRIVE GMBH & CO. KG (DE)

(*) Notice: Subject to any disclaimer, the term of this patent is extended or adjusted under 35 U.S.C. 154(b) by 127 days.

(21) Appl. No.: 16/095,574

(22) PCT Filed: Mar. 28, 2017

(86) PCT No.: PCT/EP2017/025066
§ 371 (c)(1),
(2) Date: Oct. 22, 2018

(87) PCT Pub. No.: WO2017/182134
PCT Pub. Date: Oct. 26, 2017

(65) Prior Publication Data
US 2019/0339717 A1    Nov. 7, 2019

(30) Foreign Application Priority Data
Apr. 22, 2016   (DE) .................. 10 2016 004 882

(51) Int. Cl.
*G05D 1/02*         (2020.01)
*G05B 19/418*       (2006.01)

(52) U.S. Cl.
CPC ..... *G05D 1/0297* (2013.01); *G05B 19/41895* (2013.01); *G05B 2219/32388* (2013.01);
(Continued)

(58) Field of Classification Search
CPC ......... G05D 1/0297; G05D 2201/0216; G05B 19/41895; G05B 2219/32388;
(Continued)

(56) References Cited

U.S. PATENT DOCUMENTS 5,179,329 A * 1/1993 Nishikawa ........... G05D 1/0255
                                                  180/168
5,926,117 A * 7/1999 Gunji ..................... G01S 19/04
                                                  340/988
(Continued)

FOREIGN PATENT DOCUMENTS

DE      102013008065 A1    11/2014

OTHER PUBLICATIONS

International Preliminary Report on Patentability issued from the International Bureau dated Nov. 1, 2018.
(Continued)

*Primary Examiner* — Michael C Zarroli
(74) *Attorney, Agent, or Firm* — Carter, DeLuca & Farrell LLP

(57) ABSTRACT

In a method for operating a production plant, and a production plant, the production plant includes a control device, workstations and vehicles, at least two workstations having a similar configuration. The respective processor of a vehicle determines a driving path that is as short as possible and is a function of the position of the other vehicles, and in an effort to avoid congestion or to shorten the production time, the driving path is determined such that, instead of leading to a first workstation, the driving path leads to an identical second workstation.

10 Claims, 1 Drawing Sheet

(52) U.S. Cl.
CPC .............. *G05B 2219/50393* (2013.01); *G05D 2201/0216* (2013.01)

(58) Field of Classification Search
CPC ........... G05B 2219/50393; G05B 2219/31007; G05B 2219/32259; Y02P 90/285; Y02P 90/60
See application file for complete search history.

(56) References Cited

U.S. PATENT DOCUMENTS

| | | | |
|---|---|---|---|
| 7,356,378 B1 | 4/2008 | Huang et al. | |
| 7,620,470 B1 | 11/2009 | Hickey et al. | |
| 8,239,084 B2* | 8/2012 | Yamamoto | G05D 1/024 |
| | | | 701/1 |
| 8,725,362 B2* | 5/2014 | Elston | G05D 1/0255 |
| | | | 701/50 |
| 8,838,292 B2* | 9/2014 | Palm | G05D 1/0289 |
| | | | 701/2 |
| 9,483,056 B2* | 11/2016 | Kanai | G08G 1/165 |
| 9,714,139 B1* | 7/2017 | Aggarwal | B64C 39/024 |
| 10,185,317 B2* | 1/2019 | Pichlmaier | A01B 69/008 |
| 2004/0158355 A1* | 8/2004 | Holmqvist | G05D 1/0274 |
| | | | 700/245 |
| 2012/0259482 A1* | 10/2012 | Jeschke | G05D 1/0297 |
| | | | 701/2 |
| 2018/0356821 A1* | 12/2018 | Kentley-Klay | G01S 17/87 |
| 2019/0064785 A1* | 2/2019 | Wurman | G05B 19/4189 |

OTHER PUBLICATIONS

International Search Report dated Jun. 26, 2017, in International Application No. PCT/EP2017/025066 (English-language translation).

* cited by examiner

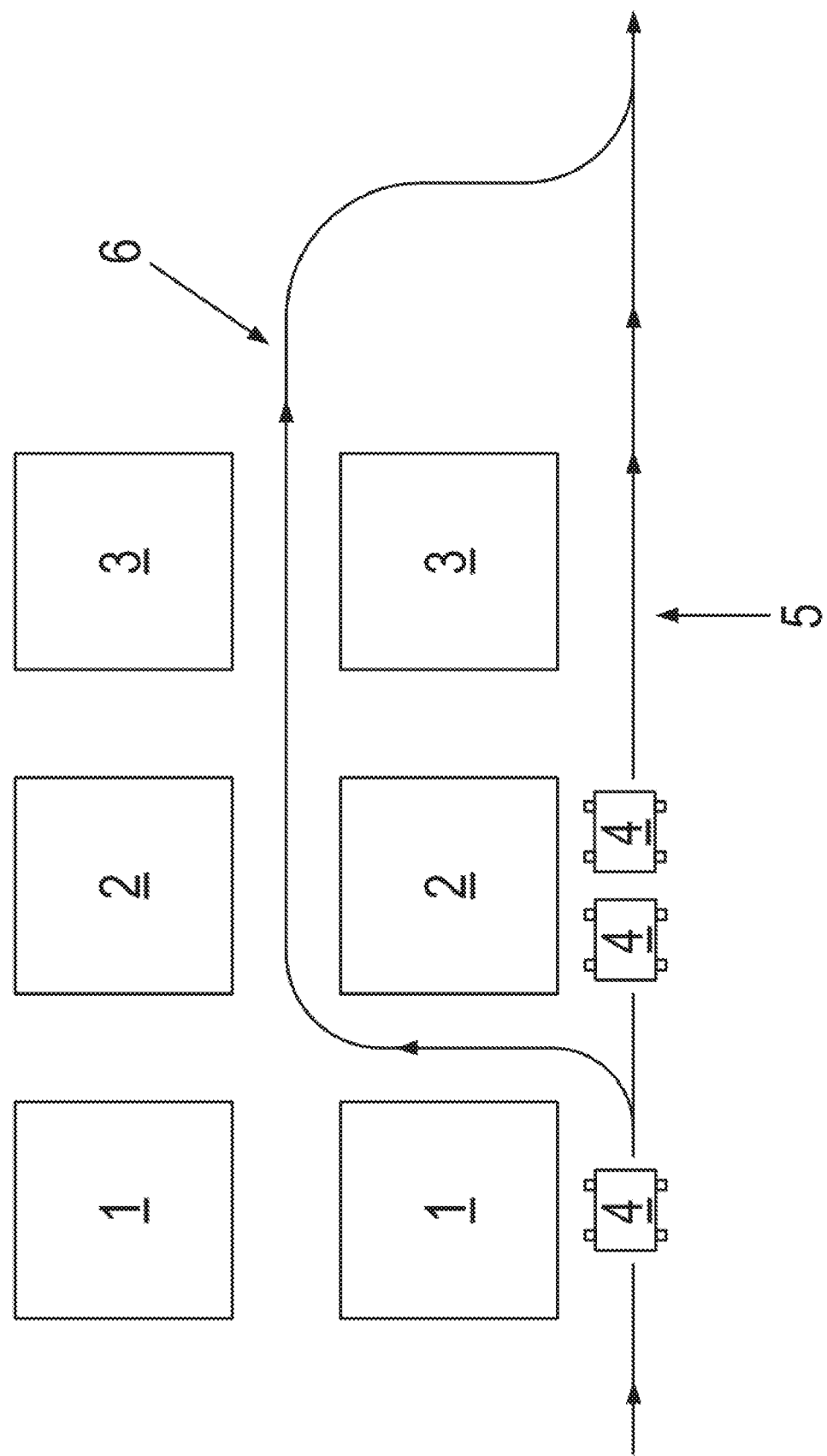

METHOD FOR OPERATING A PRODUCTION PLANT, AND PRODUCTION PLANT

FIELD OF THE INVENTION

The present invention relates to a method for operating a production plant, and to a production plant.

BACKGROUND INFORMATION

It is generally known that components in a production plant are moved with the aid of an intralogistical transport, for instance with the aid of conveyor lines.

SUMMARY

Example embodiments of the present invention provide a method for operating a production plant in a flexible manner.

According to an example embodiment of the present invention, in a method for operating a production plant are that the production plant has a higher-level control, workstations and vehicles, at least two workstations have a similar configuration so that a similarly configured second workstation is available for a first workstation; each of the vehicles includes a processor, which is connected to the higher-level control by a communications channel; each of the vehicles includes a position-detection system for detecting the position of the respective vehicle; the higher-level control transmits the position allocated to a particular workstation and to be approached by the vehicle for the performance of a production step at this respective workstation to the processors of the vehicles; the higher-level control transmits an individual order, which includes the sequence of the workstations to be reached, to the respective processor of the vehicles; the processors of the vehicles transmit their respective vehicle positions to the higher-level control; the higher-level control transmits the respective instantaneous vehicle positions to all processors in a temporally recurring manner, in particular in the form of a broadcast telegram; the processor of a vehicle determines a driving path that is as short as possible and is a function of the position of the other vehicles, and in an effort to avoid congestion or to shorten the production time, the driving path is determined such that instead of leading to a first workstation, the driving path leads to the similarly developed second workstation.

This offers the advantage that in the event of expansions or other modifications, e.g., when workstations of a similar configuration are added in order to improve the productivity of the production plant, the vehicles independently search for an adapted path for the intralogistical transport.

In comparison with the conveyor-line technology, which has the disadvantage of being inflexible if modifications have been made, the intralogistical transport according to example embodiments of the present invention is also optimized in "living" production plants, i.e. scaled plants, for instance.

Thus, if workstations having a similar configuration are added to the already existing workstations of the production plant, for instance, then the vehicle determines its path in an optimized manner. In other words, the utilization of the workstations is optimized. This increases the productivity of the plant.

The communications channel may include controllable light sources and corresponding light-sensitive sensors, at least one controllable light source and at least one light-sensitive sensor being disposed on the respective vehicle in each case, and at least one controllable light source and a light-sensitive sensor being disposed in the production plant. This offers the advantage that the illumination of the production plant is able to be used as a controllable light source. This is the case, for example, because light-emitting diodes are selectable as illumination devices so that information in the correspondingly modulated light of the illumination device(s) functioning as the controllable light source is able to be transmitted by an appropriate control of the controlling the light-emitting diodes. The light-sensitive sensors of the vehicles are thus able to receive a corresponding broadcast telegram at the same time. However, the data transmission is also configured to allow for a bidirectional transmission since a controllable light source is disposed on each vehicle so that the light-sensitive sensor fixedly disposed in the production plant is able to detect the emitted and modulated light and a corresponding sensor signal is able to be forwarded to the higher-level control.

Each workstation may include a processor and is connected to the higher-level control with the aid of a communications channel for a data transmission, the status of the workstation is reported via the communications channel to the higher-level control and from there, to the vehicles, especially with the aid of a broadcast telegram. This has the advantage that the status is able to be taken into account when planning the driving path. For example, it is possible to consider the failure or some other fault state of a workstation in that the vehicle determines a different driving path that leads to a similarly configured second workstation. Also, if a workstation reports that a production-method step having an estimated or known duration has just been started, for example, then a new driving path to a similarly configured second workstation is able to be scheduled, in particular if the driving time required for the passage is shorter than the time duration.

The processor of a respective vehicle may determine the driving path as a function of the status of the workstation, and, in particular, in the event of a malfunction of the first workstation, the processor reroutes the driving path to the similarly configured second workstation. This is considered advantageous insofar as the status is able to be taken into account when planning the driving path.

Further features and aspects of example embodiments of the present invention are described in greater detail below with reference to the FIGURE.

BRIEF DESCRIPTION OF THE DRAWING

In FIG. 1, a production plant is schematically illustrated.

DETAILED DESCRIPTION

A first workstation 1, a second workstation 2, and a third workstation 3 are disposed one after the other.

A vehicle 4 transports a component to be processed by the workstations (1, 2, 3) and approaches these workstations (1, 2, 3) in sequence while driving along a driving path 5.

A separate production-method step is performed at each of the workstations (1, 2, 3) in that the component is processed accordingly and/or in that the component is connected to a part that has been previously at the respective workstation (1, 2, 3).

The vehicle has a control, which controls the drive of the vehicle and is connected to a position-detection system.

The control of vehicle 4 includes a processor, which determines the driving path as well and predefines it as a setpoint driving path. The vehicle is then appropriately controlled along the setpoint driving path.

Furthermore, additional, similarly configured vehicles 4 are provided in the production plant, which likewise carry components and transport them to the corresponding workstations (1, 2, 3) so that a respective production-method step is able to be performed.

In an effort to avoid an excessive capacity utilization, the production plant is scaled, i.e. similarly configured workstations (1, 2, 3) are added.

The control of vehicle 4 is informed of the positions and/or possible driving paths 6 to the newly added workstations (1, 2, 3).

In addition, via the higher-level control, the control of the vehicle is informed of the respective current positions of the other vehicles (1, 2, 3).

Depending on the transmitted data, the control determines the optimum path, e.g., the shortest way, which travels to the workstations required for processing the production order in the appropriate sequence. However, if this path is blocked by backed-up vehicles 4, then a different driving path that circumvents this congestion is selected in that the newly added workstations (1, 2, 3) are taken into account when determining the driving path.

The effectiveness of the system is therefore improved and the production capacity of the production plant is utilized to an optimal extent.

In other words, example embodiments of the present invention provide a method for operating a production plant having workstations and vehicles, the vehicles the driving paths being determined as a function of the positions of the other vehicles, and the driving path is selected such that in each case the particular one of two similarly configured workstations is approached that has a lower capacity utilization or in front of which a lower number of vehicles is located, in particular in the waiting loop.

LIST OF REFERENCE NUMERALS

1 first workstation
2 second workstation
3 third workstation
4 vehicle
5 driving path
6 modified driving path

The invention claimed is:

1. A method for operating a production plant including a central control device, workstations, and vehicles, at least two workstations having a similar configuration, each vehicle including a processor connected to the central control device via a communications channel adapted for data transmission, each vehicle including a position-detection system adapted to detect a position of the respective vehicle, comprising:
   transmitting from the central control device to the processors of the vehicles a position allocated to a respective workstation that is to be approached by the vehicle for performance of a production-method step at the workstation;
   transmitting from the central control device to the processors of the vehicles an individual order that includes a sequence of the workstations to be reached;
   transmitting from the processors of the vehicles to the central control device respective vehicle position;
   recurrently transmitting from the central control device to all processors the respective instantaneous vehicle positions;
   determining, by the respective processor of a vehicle, a driving path that is as short as possible and is a function of the position of the other vehicles, and in an effort to avoid congestion or to shorten production time, the driving path is determined such that instead of leading to a first workstation, the driving path leads to a similarly configured second workstation.

2. The method according to claim 1, wherein the respective instantaneous vehicle positions are transmitted from the central control device to all processors in the form of a broadcast message.

3. The method according to claim 1, wherein the communications channel includes controllable light sources and corresponding light-sensitive sensors, at least one controllable light source and at least one light-sensitive sensor is located on the respective vehicle, and at least one controllable light source and one light-sensitive sensor is located in the production plant.

4. The method according to claim 1, wherein each workstation includes a processor and is connected to the central control device by a communications channel adapted for data transmission, a status of the workstation is reported to the central control device via the communications channel and from the central control device the status is transmitted to the vehicles.

5. The method according to claim 4, wherein the status is transmitted to the vehicles in the form of a broadcast message.

6. The method according to claim 4, wherein the respective processor of a vehicle determines the driving path as a function of the status of the workstation.

7. The method according to claim 6, wherein, in the event of a malfunction of the first workstation, the respective processor reroutes the driving path to the similarly configured second workstation.

8. A production plant, comprising:
   a central control device;
   workstations;
   vehicles; and
   a communications channel;
   wherein at least two workstations have a similar configuration, each vehicle including a processor connected to the central control device via a communications channel adapted for data transmission, each vehicle including a position-detection system adapted to detect a position of the respective vehicle; and
   wherein the production plant is adapted to perform the method recited in claim 1.

9. The production plant according to claim 8, wherein the processor of each vehicle is adapted to determine an optimal driving path.

10. A production plant adapted to perform the method recited in claim 1.

* * * * *